(12) United States Patent
Nishioka (10) Patent No.: US 9,825,420 B2
(45) Date of Patent: Nov. 21, 2017

(54) IMAGE DISPLAY APPARATUS AND ELECTRONIC APPARATUS HAVING PROJECTOR FUNCTION

(71) Applicant: Funai Electric Co., Ltd., Osaka (JP)

(72) Inventor: Ken Nishioka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 635 days.

(21) Appl. No.: 14/030,259

(22) Filed: Sep. 18, 2013

(65) Prior Publication Data

US 2014/0079080 A1 Mar. 20, 2014

(30) Foreign Application Priority Data

Sep. 19, 2012 (JP) ................................. 2012-205969

(51) Int. Cl.
  *H01S 3/102* (2006.01)
  *G09G 3/02* (2006.01)
  *H04N 9/31* (2006.01)

(52) U.S. Cl.
  CPC ............... *H01S 3/102* (2013.01); *G09G 3/02* (2013.01); *H04N 9/3135* (2013.01); *H04N 9/3194* (2013.01); *G09G 2320/0666* (2013.01); *G09G 2360/14* (2013.01); *G09G 2360/16* (2013.01)

(58) Field of Classification Search
  CPC ....... H01S 3/102; H01S 5/042; H04N 9/3135; H04N 9/3194; G09G 3/02; G09G 2360/14; G09G 2360/16; G09G 2320/0666

See application file for complete search history.

(56) References Cited

U.S. PATENT DOCUMENTS

| 2008/0094676 A1* | 4/2008 | Lach | .................... G02B 26/101 |
| | | | 359/196.1 |
| 2009/0095879 A1* | 4/2009 | Ikegami | .................. G09G 3/02 |
| | | | 250/201.1 |
| 2013/0241971 A1 | 9/2013 | Sekiya et al. | |

FOREIGN PATENT DOCUMENTS

| JP | 59-163950 A | 9/1984 |
| JP | 09-058048 A | 3/1997 |
| JP | 2002-254697 A | 9/2002 |
| WO | 2012066847 A1 | 5/2012 |

OTHER PUBLICATIONS

Extended European search report, from European patent application 13185065.3, dated Dec. 6, 2013, 8 pgs., mailed from the European Patent Office, Munich, Germany.

* cited by examiner

*Primary Examiner* — Xinning Niu (74) *Attorney, Agent, or Firm* — Baker & Hostetler LLP (57) ABSTRACT

This image display apparatus includes a plurality of laser beam source portions outputting laser beams of a plurality of color components different from each other, a synthesized beam generation portion synthesizing the laser beams of the plurality of color components, a control portion controlling the outputs of the laser beam source portions, and a driving current correction portion estimating a variation in the threshold current of each of the laser beam source portions and correcting a driving current on the basis of the estimated variation in the threshold current.

19 Claims, 7 Drawing Sheets

IMAGE DISPLAY APPARATUS AND ELECTRONIC APPARATUS HAVING PROJECTOR FUNCTION

CROSS-REFERENCE TO RELATED APPLICATIONS

The present application claims the benefit of Japanese Application Serial No. 2012-205969, with a filing date of Sep. 19, 2012.

BACKGROUND OF THE INVENTION

Field of the Invention

The present invention relates to an image display apparatus and an electronic apparatus having a projector function each synthesizing a plurality of laser beams of different color components to project a color image.

Description of the Background Art

Various image display apparatuses, such as a laser projector, each synthesizing laser beams of a red color component (R), a green color component (G), and a blue color component (B) to project and display a color image on a projection surface are put to practical use. Such an image display apparatus must create the color state of a beam obtained by synthesizing laser beams of R, G, and B in order to project and display a color image with high color reproducibility.

A laser diode (LD) employed as a laser beam source for each color has such characteristics that the output of a laser beam is started when a driving current reaches at least a threshold current and thereafter the light output (the light quantity of the laser beam) is increased with an increase in the driving current. Thus, the LD is a light-emitting element whose light output is varied according to the amount of supply of the driving current, but as another factor in varying the light output, there is a temperature change. This is because the threshold current of the LD is changed according to the temperature, and the threshold current is changed due to heat generation of the LD itself, so that the light output is varied. This causes loss of a white balance.

Figure 7:
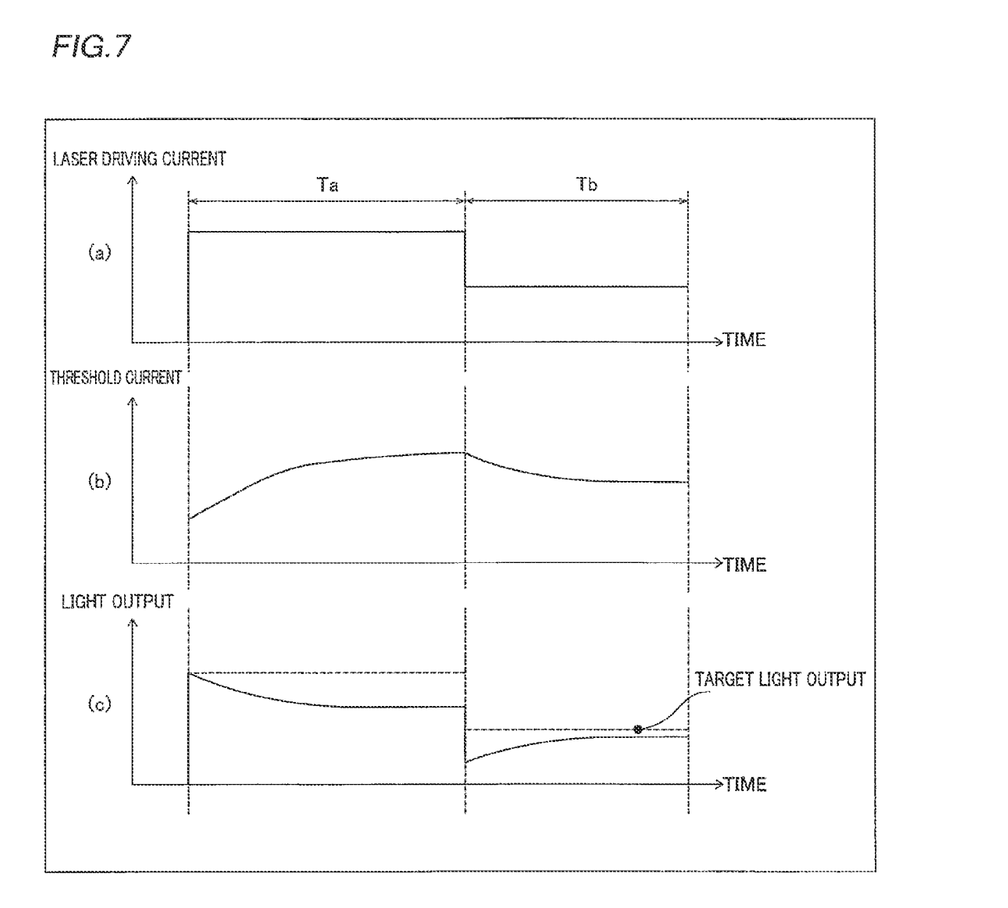
FIG. 7 illustrates the relationship between a driving current, a threshold current, and a light output according to the embodiment of the present invention; view (a) illustrates a driving current which is initially less than the threshold current; view (b) illustrates a threshold current when supplied with the driving current of view (a); view (c) illustrates a light output when supplied with the driving current of view (a).

The relationship between the driving current, the threshold current, and the light output is described with reference to FIG. 7. In view (a) of FIG. 7, the driving current is initially less than the threshold current (is zero, for example), thereafter a certain amount of driving current equal to or larger than the threshold current is continuously supplied in a period Ta, and thereafter a certain amount of driving current lower than the driving current in the period Ta and equal to or larger than the threshold current is continuously supplied in a period Tb. When the driving current in this pattern is supplied to the LD, as shown in view (b) and (c) of FIG. 7, the threshold current of the LD is increased with time and the light output is gradually reduced with this and is stabilized at a value less than a target value in the period Ta. In the later period Tb, the threshold current of the LD is reduced with time, and the light output is gradually increased with this and is stabilized at a value less than a target value similarly to in the period Ta.

As a technology to inhibit this variation in the light output, there is APC (automatic power control). In APC, for example, the light output (the light quantity of the laser beam) from the LD is detected and is compared with the target value, and the amount of supply of the driving current is so controlled that the detection value approaches the target value, whereby a variation in the light output is inhibited.

Japanese Patent Laying-Open No. 9-058048 (1997) discloses a technology to measure light output variation characteristics when a light source is on and off, obtain a decay rate and a recovery rate from the measurement result, and determine correction data of an (m+1)th pixel from image density data of the (m+1)th pixel and accumulated data to an m-th pixel. In this technology, no consideration is given to the case where the decay rate converges.

Japanese Patent Laying-Open No. 59-163950 (1984) discloses a technology to measure time change characteristics of light intensity and correct current to cancel the amount of change of the light intensity at the time point at which a modulation signal is input. This technology deals with only the reduction of an output, and no consideration is given to the recovery of the output.

Japanese Patent Laying-Open No. 2002-254697 discloses a technology to detect a light output variation before and after a line, superimpose a current when the light output is varied by a certain amount or more, and prevent superimposition of a current when the light output is varied by less than a certain amount. In this technology, processing is performed assuming a variation in image data as an output variation identical to that in the case where an apparatus operates with a constant current.

When the APC is performed each time one line in a horizontal direction (direction X) is scanned, for example, light unnecessary for a user is frequently emitted. Furthermore, when the APC is performed for each frame period in order to inhibit emission of the unnecessary light as much as possible, for example, a blanking period during which the light output from the LD is off is generated, and hence it is necessary to consider an increase of the light output after the blanking period.

SUMMARY OF THE INVENTION

The present invention has been proposed in order to solve the aforementioned problem, and an object of the present invention is to propose a technology to be capable of maintaining a white balance while effectively inhibiting a variation in a light output from a laser beam source portion in an image display apparatus.

An image display apparatus according to a first aspect of the present invention includes a plurality of laser beam source portions outputting laser beams of a plurality of color components different from each other, a synthesized beam generation portion synthesizing the laser beams of the plurality of color components, a control portion controlling the outputs of the laser beam source portions, and a driving current correction portion estimating a variation in the threshold current of each of the laser beam source portions and correcting a driving current on the basis of the estimated variation in the threshold current.

As hereinabove described, the image display apparatus according to the first aspect is provided with the driving current correction portion estimating the variation in the threshold current of each of the laser beam source portions and correcting the driving current on the basis of the estimated variation in the threshold current, whereby variations in light outputs from the laser beam source portions can be effectively inhibited by estimating the variation in the threshold current of each of the laser beam source portions and correcting the driving current while reflecting this. Thus, a white balance can be maintained.

In the aforementioned image display apparatus according to the first aspect, the driving current correction portion is preferably configured to estimate the variation in the threshold current by calculating the amount of change of the threshold current for each prescribed time and summing the amount of change of the threshold current. According to this structure, the variation in the threshold current can be accurately estimated by such a method as to calculate the amount of change (the difference) of the threshold current for each prescribed time and sum the same, and hence the variations in the light outputs from the laser beam source portions can be effectively inhibited.

In this case, the driving current correction portion is preferably configured to update the threshold current by adding the amount of change of the threshold current for each prescribed time to a present threshold current so as to estimate the variation in the threshold current. According to this structure, the present threshold current obtained by adding up the amount of change (the difference) of the threshold current for each prescribed time is updated from time to time to estimate the variation, and hence the variation in the threshold current can be accurately estimated for each prescribed time according to the driving current.

In the aforementioned image display apparatus according to the first aspect, the driving current correction portion is preferably configured to employ the threshold current at a projection start position of one frame as the initial value of the threshold current. According to this structure, after a blanking period during which the outputs of the laser beams are stopped, an estimation error of the threshold current can be initialized frame by frame.

The aforementioned image display apparatus according to the first aspect preferably further includes a variation characteristics acquisition portion measuring a variation in the output of each of the laser beam source portions when the laser beam source portions each operate with the driving current having a prescribed measurement pattern and acquiring variation characteristics employed for the estimation of the variation in the threshold current on the basis of the measured variation in the output. According to this structure, the driving current correction portion can easily correct the driving current on the basis of the variation characteristics acquired by the variation characteristics acquisition portion.

In the aforementioned structure including the variation characteristics acquisition portion, the prescribed measurement pattern preferably includes a pattern of increasing the driving current and a pattern of decreasing the driving current. According to this structure, the driving current can be corrected correspondingly to both cases of the reduction of the laser beam outputs and the recovery of the laser beam outputs.

In the aforementioned structure including the variation characteristics acquisition portion, the image display apparatus preferably further includes a detection portion detecting the light quantity of a laser beam, and the variation characteristics acquisition portion is preferably configured to acquire the variation characteristics employed for the estimation of the variation in the threshold current on the basis of the driving current and the light quantity of the laser beam detected by the detection portion. According to this structure, the detection portion detects the change of the light quantity of the laser beam, whereby the variation characteristics acquisition portion can easily acquire the variation characteristics.

In this case, the image display apparatus preferably further includes a branching unit branching the laser beams output from the laser beam source portions into a laser beam for image display and a laser beam for detection, and the detection portion is preferably configured to detect the laser beam for detection branched by the branching unit. According to this structure, the detection portion detects the change of the light quantity of the laser beam for detection branched by the branching unit, whereby the variation characteristics acquisition portion can easily acquire the variation characteristics.

In the aforementioned structure including the variation characteristics acquisition portion, the variation characteristics acquisition portion is preferably configured to acquire the variation characteristics employed for the estimation of the variation in the threshold current on the basis of a laser beam output to the outside of an image display area during image display. According to this structure, the influence of the laser beam for detection on the image display can be prevented when the variation characteristics are acquired, and processing time can be reduced as compared with the case where a dedicated period for acquiring the variation characteristic is separately provided.

The aforementioned image display apparatus according to the first aspect preferably further includes a current generation portion generating a current supplied to the plurality of laser beam source portions on the basis of an input image information signal and an adding portion adding a correction current output from the driving current correction portion to the current output from the current generation portion. According to this structure, the variations in the outputs of the laser beams can be effectively inhibited by adding the correction current output from the driving current correction portion to the current based on the image information signal, and hence the white balance can be easily maintained.

The aforementioned image display apparatus according to the first aspect preferably further includes a detection portion detecting the light quantity of a laser beam and a current-light quantity characteristics acquisition portion acquiring the relationship between a current and a light quantity on the basis of the driving current and the light quantity of the laser beam detected by the detection portion. According to this structure, the current-light quantity characteristics acquisition portion can easily acquire the relationship between the current and the light quantity for converting the image information signal into the laser beam.

In the aforementioned structure including the current-light quantity characteristics acquisition portion, the image display apparatus preferably further includes a branching unit branching the laser beams output from the laser beam source portions into a laser beam for image display and a laser beam for detection, and the detection portion is preferably configured to detect the laser beam for detection branched by the branching unit. According to this structure, the detection portion detects the light quantity of the laser beam for detection branched by the branching portion, whereby the current-light quantity characteristics acquisition portion can easily acquire the relationship between the current and the light quantity.

In this case, the branching unit is preferably provided in the optical path of a synthesized beam obtained by synthesizing the laser beams of the plurality of color components, and the current-light quantity characteristics acquisition portion is preferably configured to allow the plurality of laser beam source portions one by one to output the laser beams and acquire the relationship between the current and the light quantity on the basis of the light quantity of a branched laser beam of one color component detected by the detection portion and the driving current. According to this structure, the branching unit and the detection portion can be shared for the color components, and hence the number of components can be reduced.

In the aforementioned structure including the current-light quantity characteristics acquisition portion, the current-light quantity characteristics acquisition portion is preferably configured to acquire the relationship between the current and the light quantity on the basis of a laser beam output to the outside of an image display area during image display. According to this structure, the influence of the laser beam for detection on the image display can be prevented when the relationship between the current and the light quantity is acquired, and the processing time can be reduced as compared with the case where a dedicated period for acquiring the relationship between the current and the light quantity is separately provided.

The aforementioned image display apparatus according to the first aspect preferably further includes a variation characteristics acquisition portion measuring a variation in the output of each of the laser beam source portions when the laser beam source portions each operate with the driving current having a prescribed measurement pattern and acquiring variation characteristics employed for the estimation of the variation in the threshold current, a current conversion portion generating a current supplied to the plurality of laser beam source portions on the basis of an input image information signal, a current-light quantity characteristics acquisition portion acquiring the relationship between a current and a light quantity on the basis of the driving current and the light quantity of a laser beam, and an output selection portion selecting from among a current output from the variation characteristics acquisition portion, a current output from the current conversion portion, and a current output from the current-light quantity characteristics acquisition portion and outputting the selected current to the laser beam source portions. According to this structure, the variation characteristics acquisition portion, the current conversion portion, or the current-light quantity characteristics acquisition portion is selected to output the current according to the case of acquiring the variation characteristics, the case of displaying an image, or the case of acquiring the relationship between the current and the light quantity, and hence control of the current can be easily performed in each case.

An electronic apparatus having a projector function according to a second aspect of the present invention includes a plurality of laser beam source portions outputting laser beams of a plurality of color components different from each other, a synthesized beam generation portion synthesizing the laser beams of the plurality of color components, a control portion controlling the outputs of the laser beam source portions, and a driving current correction portion estimating a variation in the threshold current of each of the laser beam source portions and correcting a driving current on the basis of the estimated variation in the threshold current.

As hereinabove described, the electronic apparatus having a projector function according to the second aspect is provided with the driving current correction portion estimating the variation in the threshold current of each of the laser beam source portions and correcting the driving current on the basis of the estimated variation in the threshold current, whereby variations in light outputs from the laser beam source portions can be effectively inhibited by estimating the variation in the threshold current of each of the laser beam source portions and correcting the driving current while reflecting this. Thus, the electronic apparatus having a projector function capable of maintaining a white balance can be provided.

In the aforementioned electronic apparatus having a projector function according to the second aspect, the driving current correction portion is preferably configured to estimate the variation in the threshold current by calculating the amount of change of the threshold current for each prescribed time and summing the amount of change of the threshold current. According to this structure, the variation in the threshold current can be accurately estimated by such a method as to calculate the amount of change (the difference) of the threshold current for each prescribed time and sum the same, and hence the variations in the light outputs from the laser beam source portions can be effectively inhibited.

In this case, the driving current correction portion is preferably configured to update the threshold current by adding the amount of change of the threshold current for each prescribed time to a present threshold current so as to estimate the variation in the threshold current. According to this structure, the present threshold current obtained by adding up the amount of change (the difference) of the threshold current for each prescribed time is updated from time to time to estimate the variation, and hence the variation in the threshold current can be accurately estimated for each prescribed time according to the driving current.

In the aforementioned electronic apparatus having a projector function according to the second aspect, the driving current correction portion is preferably configured to employ the threshold current at a projection start position of one frame as the initial value of the threshold current. According to this structure, after a blanking period during which the outputs of the laser beams are stopped, an estimation error of the threshold current can be initialized frame by frame.

The aforementioned electronic apparatus having a projector function according to the second aspect preferably further includes a variation characteristics acquisition portion measuring a variation in the output of each of the laser beam source portions when the laser beam source portions each operate with the driving current having a prescribed measurement pattern and acquiring variation characteristics employed for the estimation of the variation in the threshold current on the basis of the measured variation in the output, and the prescribed measurement pattern preferably includes a pattern of increasing the driving current and a pattern of decreasing the driving current. According to this structure, the driving current correction portion can easily correct the driving current on the basis of the variation characteristics acquired by the variation characteristics acquisition portion. Furthermore, the driving current can be corrected correspondingly to both cases of the reduction of the laser beam outputs and the recovery of the laser beam outputs.

The driving current correction portion, the variation characteristics acquisition portion, and the current-light quantity characteristics acquisition portion according to the present invention each can have a circuit configuration employing an electronic component and also can be configured as a functional module employing computer hardware and software and so configured that the computer hardware executes the software.

According to the present invention, even when the threshold currents of the laser beam source portions are varied due to a temperature change, the variations in the light outputs from the laser beam source portions can be effectively inhibited, and the white balance can be maintained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention is applicable to various image display apparatuses each synthesizing laser beams of different color components output from a plurality of laser beam source portions to display a color image, but as an example of applying the present invention, a laser projector is hereinafter described. This laser projector synthesizes laser beams of three color components of a red color component (R), a green color component (G), and a blue color component (B) and scans this synthesized beam by a scan mirror to project and display a color image on a projection surface.

Figure 1:
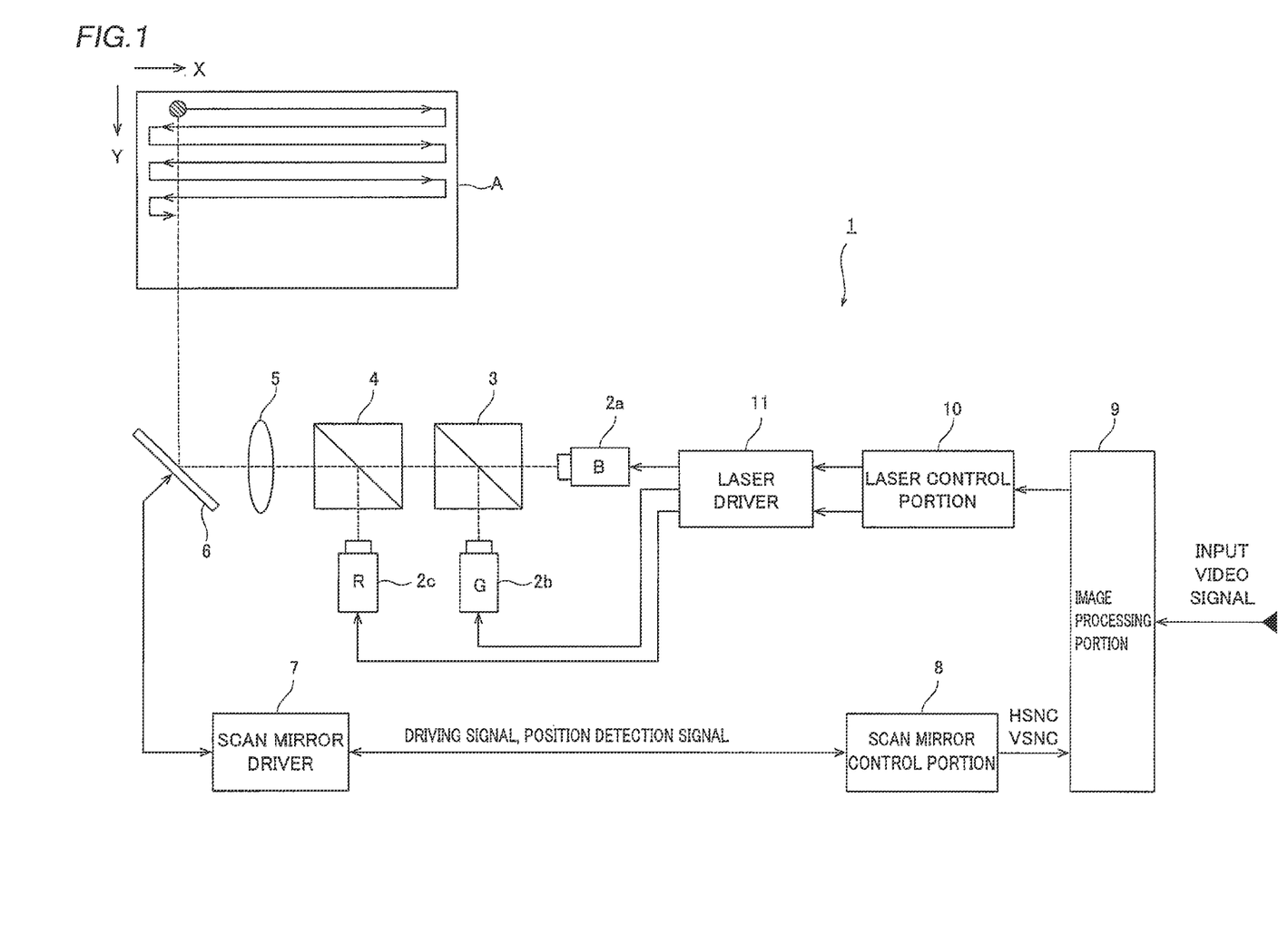
FIG. 1 illustrates the structure of a main section of an image display apparatus according to an embodiment of the present invention.

FIG. 1 illustrates the structure of a main section of a laser projector 1. The laser projector 1 according to this embodiment is mainly constituted by laser beam sources 2a to 2c, various optical elements 3 to 5, a scan mirror 6, and various drive/control units 7 to 11. The laser projector 1 synthesizes laser beams of color components of R, G, and B, and thereafter projects the synthesized beam on a projection surface A, such as a screen or a wall, thereby displaying a color image according to an input video signal on the projection surface A. The laser projector 1 is an example of the "image display apparatus" or the "electronic apparatus having a projector function" in the present invention. The laser beam sources 2a to 2c are examples of the "laser beam source portions" in the present invention.

The laser beam sources 2a to 2c are laser diodes (LDs) outputting laser beams of color components different from each other and are driven independently of each other by driving currents individually supplied from the laser driver 11 to output laser beams of single color components. Thus, the laser beams of the single color components of specified wavelengths are emitted such that a laser beam of a blue color component (B) is emitted from the laser beam source 2a, a laser beam of a green color component (G) is emitted from the laser beam source 2b, and a laser beam of a red color component (R) is emitted from the laser beam source 2c.

The dichroic mirrors 3 and 4 transmit only laser beams of specified wavelengths and reflect others thereby synthesizing the laser beams of the color components of R, G, and B emitted from the laser beam sources 2a to 2c. Specifically, the laser beams of the blue color component and the green color component emitted from the laser beam sources 2a and 2b are synthesized in the dichroic mirror 3 on the upstream of an optical path, and thereafter are emitted to the dichroic mirror 4 on the downstream of the optical path. This emitted synthesized beam and the laser beam of the red color component emitted from the laser beam source 2c are further synthesized in the dichroic mirror 4, and are emitted as a targeting final color-synthesized beam. The dichroic mirrors 3 and 4 constitute an optical portion synthesizing the laser beams of the color components of R, G, and B, and this color-synthesized beam is incident on the scan mirror 6 through the lens 5. The dichroic mirrors 3 and 4 are examples of the "synthesized beam generation portion" in the present invention.

The scan mirror 6 is displaced in a horizontal direction (direction X) and a vertical direction (direction Y) by the scan mirror driver 7 into which a driving signal is input from the scan mirror control portion 8, reflects the color beam incident on the scan mirror 6 according to the deflection angle of the scan mirror 6, and projects the same on the projection surface A. According to this embodiment, as the scan mirror 6, a MEMS (micro electro mechanical system) scan mirror advantageous for downsizing, low power consumption, speeding up of processing, etc. is employed.

The image processing portion 9 transmits video data to the laser control portion 10 at prescribed time intervals on the basis of a video signal input from an external device such as a personal computer, whereby the laser control portion 10 obtains pixel information at a prescribed scan position. The laser control portion 10 controls the laser driver 11 with a driving current waveform signal in order to project an image including a plurality of pixels on a projection range on the basis of the pixel information. Control performed by the laser control portion 10 is described later in detail. The laser control portion 10 is an example of the "control portion" in the present invention.

The laser driver 11 drives the laser beam sources 2a to 2c to allow the laser beam sources 2a to 2c to emit the laser beams on the basis of the aforementioned control performed by the laser control portion 10. The laser diodes (LDs) constituting the laser beam sources 2a to 2c emit the laser beams when the driving currents equal to or greater than the threshold current are supplied from the laser driver 11 and output the laser beams having larger light quantities as the driving currents increase. Furthermore, the laser beam sources 2a to 2c stop outputting the laser beams when the currents less than the threshold current are supplied.

Figure 2:
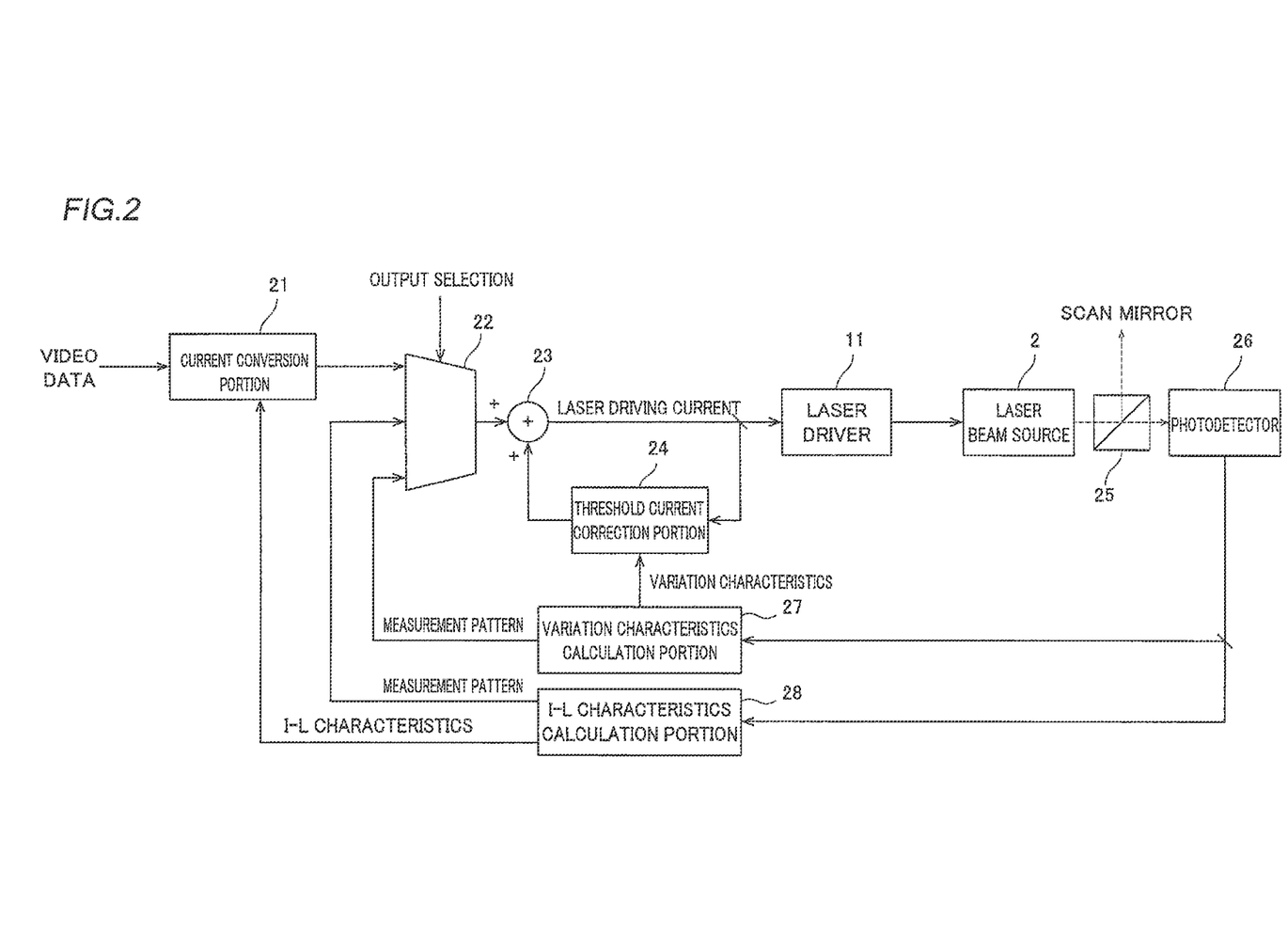
FIG. 2 illustrates the internal structure of a laser control portion and the structure of a relevant functional portion of the image display apparatus according to the embodiment of the present invention.

FIG. 2 illustrates the internal structure of the laser control portion 10 and the structure of a relevant functional portion. The laser control portion 10 according to this embodiment includes a current conversion portion 21, an output selection portion 22, an adding portion 23, a threshold current correction portion 24, a variation characteristics calculation portion 27, and an I-L characteristics calculation portion 28. The laser projector 1 according to this embodiment is provided with a branching unit 25 and a photodetector 26 in order to detect light output from a laser beam source 2 (2a to 2c) and feed back to the laser control portion 10. The laser beam source 2 is an example of the "laser beam source portions" in the present invention, and the current conversion portion 21 is an example of the "current generation portion" in the present invention. The threshold current correction portion 24 is an example of the "driving current correction portion" in the present invention, and the photodetector 26 is an example of the "detection portion" in the present invention. The variation characteristics calculation portion 27 is an example of the "variation characteristics acquisition portion" in the present invention, and the I-L characteristics calculation portion 28 is an example of the "current-light quantity characteristics acquisition portion" in the present invention.

The branching unit 25 is provided on an optical path from the laser beam source portion 2 (2a to 2c) to the scan mirror 6 (between the lens 5 and the scan mirror 6, for example) and branches the laser beam from the laser beam source 2 to emit one to the scan mirror 6 and the other to the photodetector 26. According to this embodiment, a prism is employed as the branching unit 25. The photodetector 26 detects the light quantity (the light output) of the laser beam branched by the branching unit 25 and feeds back a signal of the result (the detection value of the light output) to the laser control portion 10. According to this embodiment, a photodiode (PD) is employed as the photodetector 26.

The current conversion portion 21 converts pixel values of R, G, and B of each pixel into driving currents supplied to the laser beam source 2 corresponding to the color components of R, G, and B on the basis of video data supplied from the image processing portion 9 and outputs the same. The conversion into the driving currents is performed with reference to I-L characteristics previously calculated for each laser beam source (each color component). This I-L characteristics denotes the relationship between the driving current I supplied to the laser beam source 2 and the light output (the light quantity) L from the laser beam source 2.

The I-L characteristics calculation portion 28 supplies the driving current to the laser beam source 2 of each color component in a prescribed measurement pattern and compares the detection result of the photodetector 26 at that time with the amount of supply of the driving current to calculate the I-L characteristics employed for current conversion for each laser beam source 2 of the color components and output the same to the current conversion portion 21. The I-L characteristics calculation portion 28 according to this embodiment calculates the I-L characteristics outside the period during image display (the period during which a position scanned by the scan mirror 6 is outside an image area during image display, for example) so as not to influence the image display.

The variation characteristics calculation portion 27 supplies the driving current to the laser beam source 2 of each color component in a prescribed measurement pattern, calculates variation characteristics employed for current correction for each laser beam source 2 of the color components on the basis of the detection result of the photodetector 26 at that time and the amount of supply of the driving current, and outputs the same to the threshold current correction portion 24. A calculation procedure of the variation characteristics is described later in detail. The variation characteristics calculation portion 27 according to this embodiment calculates the variation characteristics outside the period during image display (the period during which a position scanned by the scan mirror 6 is outside the image area during image display, for example) so as not to influence the image display.

The output selection portion 22 selectively outputs any of the driving current (the current converted from the video data) output from the current conversion portion 21, the driving current (the current having the measurement pattern for variation characteristics calculation) output from the variation characteristics calculation portion 27, and the driving current (the current having the measurement pattern for I-L characteristics calculation) output from the I-L characteristics calculation portion 28. The output selection of the output selection portion 22 is performed on the basis of an output selection signal input from the image processing portion 9 (or another control portion).

The threshold current correction portion 24 estimates a variation in the threshold current of each laser beam source 2 employing the variation characteristics previously calculated for each laser beam source 2 (each color component), calculates a correction current difference on the basis of the estimated variation in the threshold current, and outputs the calculated correction current difference to the adding portion 23, as described later. The adding portion 23 adds a correction threshold current output from the threshold current correction portion 24 to the driving current output through the output selection portion from the current conversion portion 21 and outputs the corrected driving current as the result to the laser driver 11.

Figure 3:
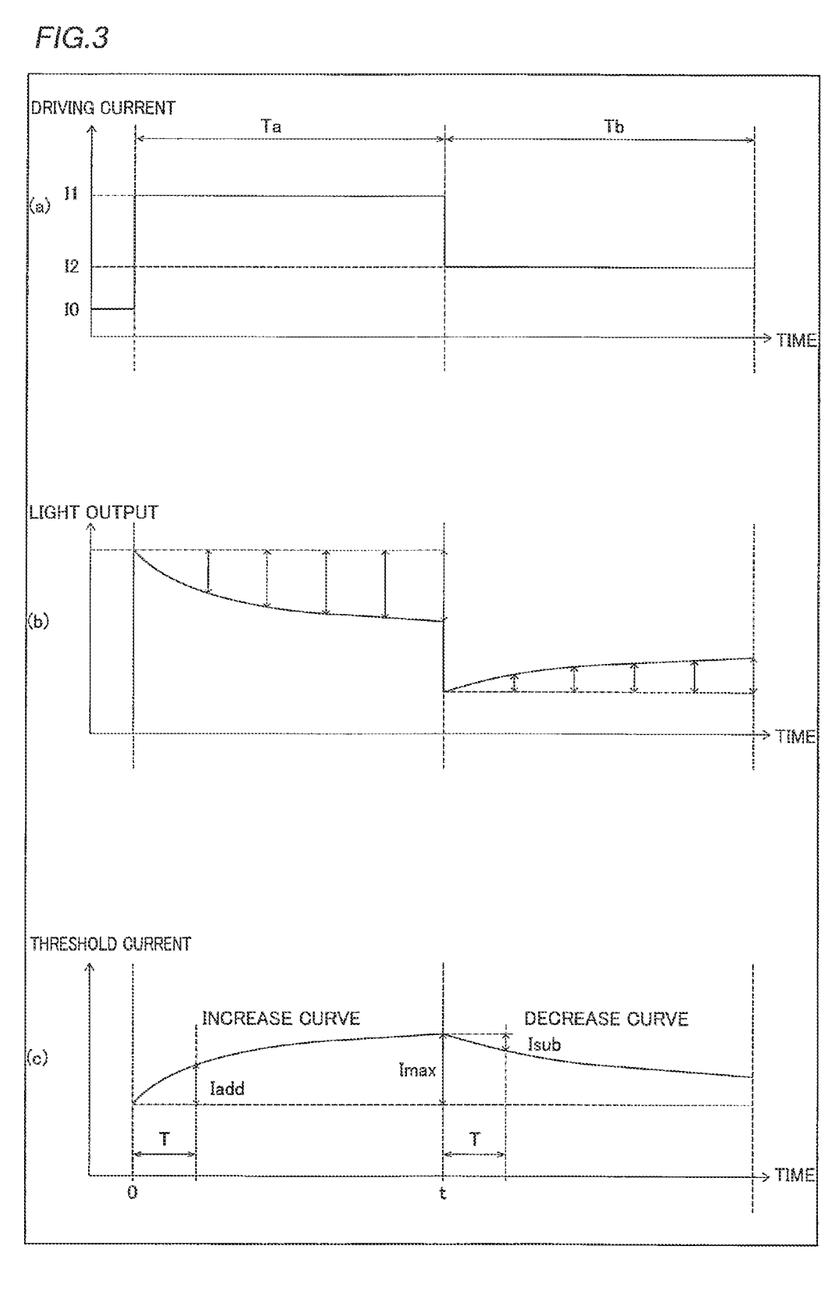
FIG. 3 illustrates a calculation procedure of variation characteristics in the image display apparatus according to the embodiment of the present invention; view (a) illustrates the driving current pattern; view (b) illustrates the light output; view (c) illustrates the variation function of the threshold current.

The calculation procedure of the variation characteristics performed by the variation characteristics calculation portion 27 is now described. The variation characteristics calculation portion 27 operates the laser beam source 2 with the driving current having the prescribed measurement pattern and measures the variation state of the light output detected by the photodetector 26 at that time. Specifically, the variation characteristics calculation portion 27 operates the laser beam source 2 with the driving current having a pattern shown in view (a) of FIG. 3, for example. In other words, the driving current is increased from I0 (it may be 0 mA) less than the threshold current to I1 equal to or greater than the threshold current and is supplied for a certain period of time, and thereafter the driving current is decreased from I1 to I2 greater than or equal to the threshold current and is supplied for a certain period of time. The period during which the driving current of I1 is supplied is referred to as Ta, and the period during which the driving current of I2 is supplied is referred to as Tb. The time t that is the length of the period Ta and the period Tb is set to the time required for the light output variation to converge within a certain range, and the maximum thereof is the projection time of one line. Consequently, the light output shown in view (b) of FIG. 3 is detected by the photodetector 26. In other words, in the period Ta during which the driving current is increased from I0 to I1, a state where the light output is gradually reduced is measured, and in the period Tb during which the driving current is decreased from I1 to I2, a state where the light output gradually recovers is measured.

Thereafter, the variation characteristics calculation portion 27 converts the measurement result of the photodetector 26 into a variation function of the threshold current on the basis of the I-L characteristics of the laser beam source 2. Consequently, the variation function of the threshold current shown in view (c) of FIG. 3 is obtained. In other words, in the period Ta during which the driving current is increased from I0 to I1, an increase curve indicating a state where the threshold current is gradually increased is obtained, and in the period Tb during which the driving current is decreased from I1 to I2, a decrease curve indicating a state where the threshold current is gradually decreased is obtained.

Figure 4:
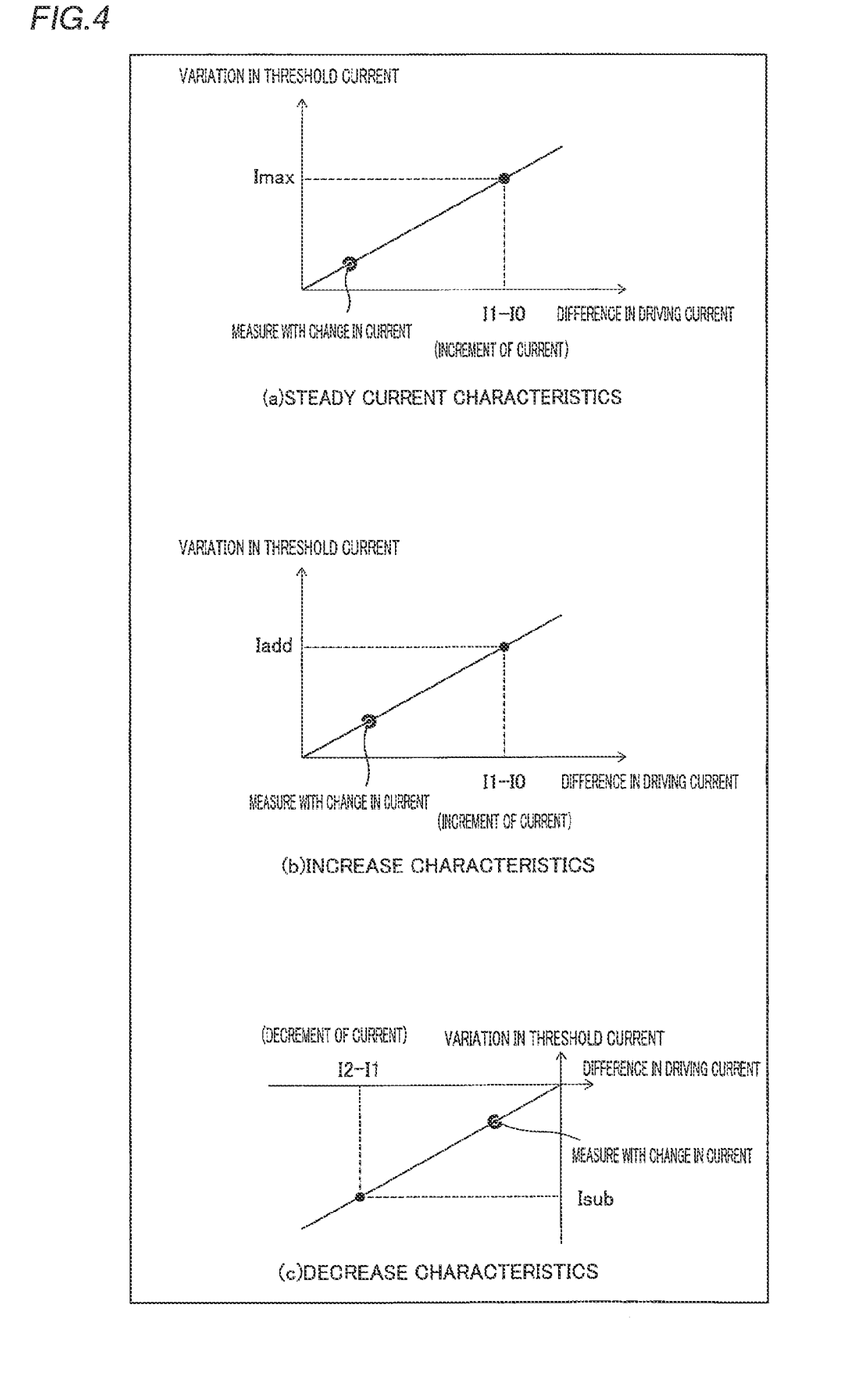
FIG. 4 illustrates variation characteristics in the image display apparatus according to the embodiment of the present invention; view (a) illustrates steady current characteristics; view (b) illustrates increase characteristics; view (c) illustrates decrease characteristics.

A difference between the threshold current at the time point at which the period Ta starts and the threshold current at the time point at which the period Ta terminates is set to Imax. When the relationship between a difference in the driving current (I1–I0) and a variation in the threshold current (Imax) is illustrated graphically, steady current characteristics shown in view (a) of FIG. 4 are obtained. These steady current characteristics mean the threshold current varying from the time point at which the driving current is increased to the time point at which the change rate of the light output converges within a certain range.

As to the time T of a prescribed length serving as a unit of current correction, a difference between the threshold current at the time point at which the period Ta starts and the threshold current at the time point at which the time T elapses after the start of the period Ta is set to Iadd. When the relationship between the difference in the driving current (I1–I0) and a variation in the threshold current (Iadd) is illustrated graphically, increase characteristics shown in view (b) of FIG. 4 is obtained. These increase characteristics mean the amount of change of the threshold current after the time T with respect to an increment of the driving current.

As to the time T of a prescribed length serving as a unit of current correction, a difference between the threshold current at the time point at which the period Tb starts and the threshold current at the time point at which the time T elapses after the start of the period Tb is set to Isub. When the relationship between a difference in the driving current (I2–I1) and a variation in the threshold current (Isub) is illustrated graphically, decrease characteristics shown in view (c) of FIG. 4 is obtained. These decrease characteristics mean the amount of change of the threshold current after the time T with respect to a decrement of the driving current. The variation characteristics calculation portion 27 outputs the steady current characteristics, the increase characteristics, the decrease characteristics calculated as described above to the threshold current correction portion 24 as the variation characteristics.

Figure 5:
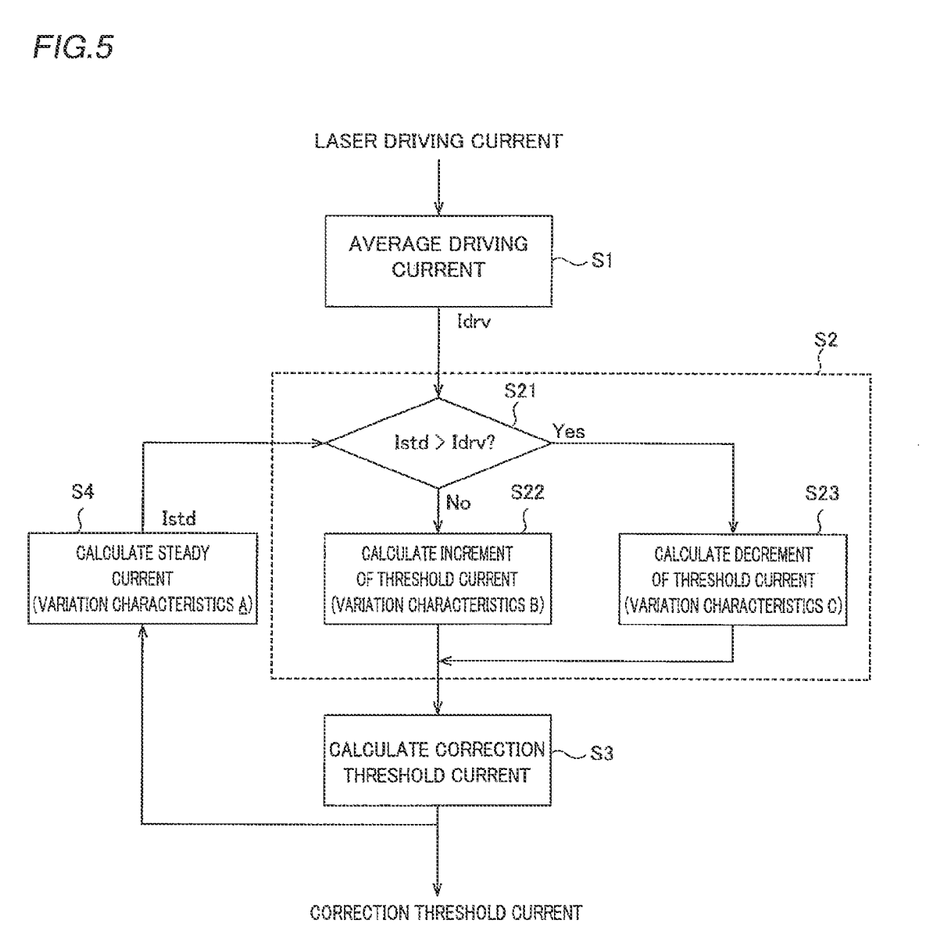
FIG. 5 illustrates an example of a calculation flow of a correction threshold current in the image display apparatus according to the embodiment of the present invention.

FIG. 5 illustrates an example of a calculation flow of the correction threshold current added to the driving current. The threshold current correction portion 24 obtains the correction threshold current added to the driving current for driving current correction by the following procedure. First, the threshold current correction portion 24 takes in part of the driving current supplied to the laser beam source 2 and averages the driving current of several clocks (several pixels) corresponding to the time T to calculate an average driving current (step S1). The driving current that is taken in is a driving current in which previous correction is reflected (a previous corrected driving current).

Then, the threshold current correction portion 24 compares the average driving current with a present steady current (a steady current in which previous correction is reflected) and calculates the correction current difference indicating the amount of change of the threshold current (step S2). The steady current is the driving current in a state where the light output variation is not generated (a state where the change rate of the light output converges within the certain range) and is calculated at a step S4 described later. Then, the threshold current correction portion 24 adds the correction current difference to a present correction threshold current (a correction threshold current employed for previous correction) and updates the correction threshold current (step S3). In other words, the threshold current correction portion 24 according to this embodiment calculates the correction current difference (the amount of change of the threshold current) for each time T and sums the same thereby estimating the variation in the threshold current. As the initial value of the threshold current, the threshold current in a projection start position of one frame may be employed, for example, and on the basis of this, the correction current difference is calculated and is summed, whereby the variation in the threshold current can be estimated.

This correction threshold current is added to the driving current by the adding portion 23, and the corrected driving current as the result is supplied from the laser driver 11 to the laser beam source 2. The threshold current correction portion 24 updates the steady current on the basis of the present correction threshold current (the correction threshold current employed for correction in this time) and the steady current characteristics (step S4).

The calculation of the correction current difference (step S2) is further described. First, the average driving current (Idrv) and the steady current (Istd) are compared with each other (step S21). When the average driving current is determined to be larger than the steady current (Istd<Idrv), the laser beam source 2 is further heated, so that an increment of the threshold current (the correction current difference) with respect to a difference between the steady current Istd and the average driving current Idrv is calculated from the increase characteristics (step S22).

When the average driving current is determined to be smaller than the steady current (Istd>Idrv), on the other hand, the laser beam source 2 is cooled (the light output recovers), so that a decrement of the threshold current (the correction current difference) with respect to the difference between the steady current Istd and the average driving current Idrv is calculated from the decrease characteristics (step S23). When the average driving current is equal to the steady current (Istd=Idrv), the variation in the light output falls within a certain range, so that it is not necessary to correct the driving current. In other words, the correction current difference is zero.

Figure 6:
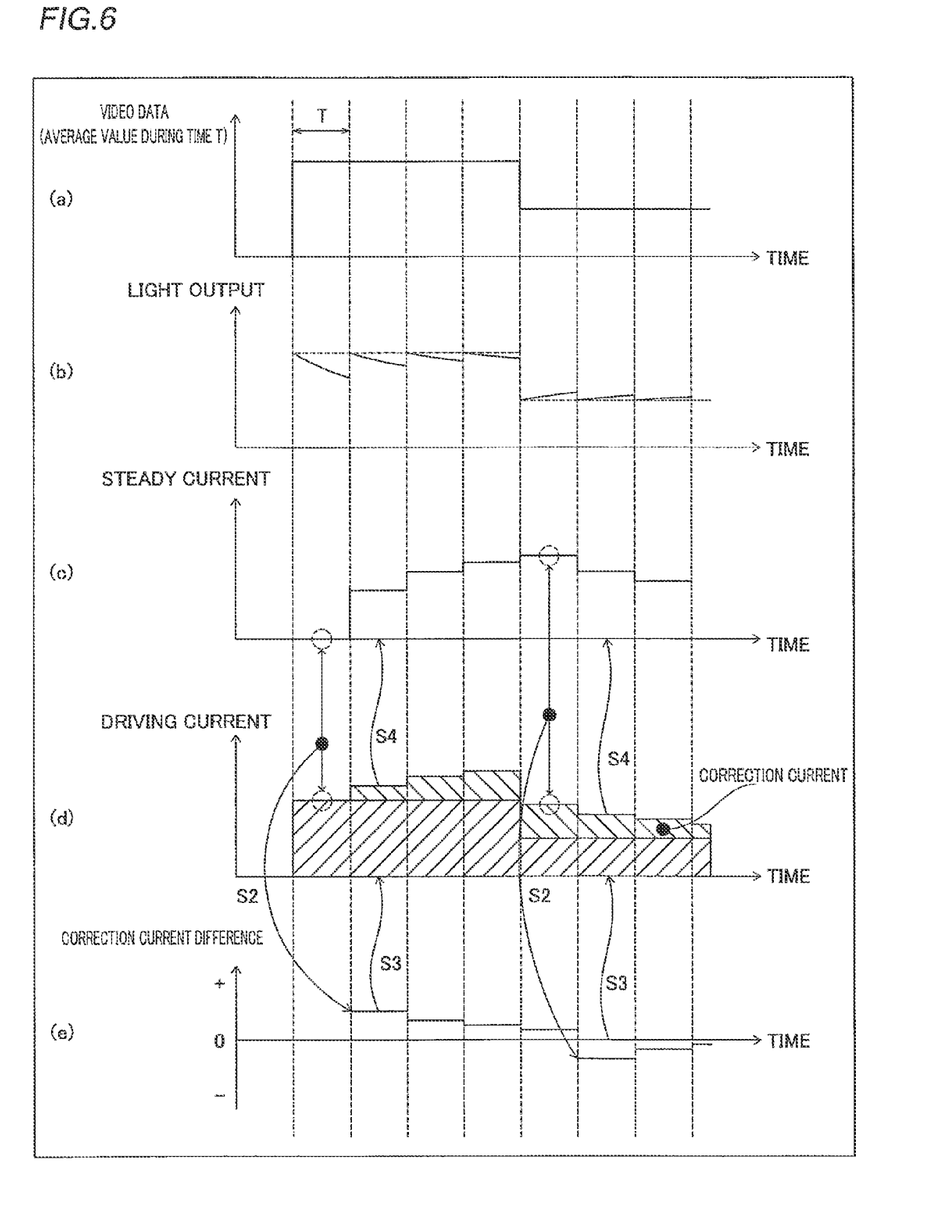
FIG. 6 illustrates a driving current correction procedure in the image display apparatus according to the embodiment of the present invention; view (a) illustrates video data variance; view (b) illustrates light output variance; view (c) illustrates steady current variance; view (d) illustrates driving current variance; and view (e) illustrates correction current difference variance.

FIG. 6 illustrates the state of the driving current correction. View (a) of FIG. 6 illustrates how the video data varies in time, view (b) of FIG. 6 illustrates how the light output varies in time, view (c) of FIG. 6 illustrates how the steady current varies in time, view (d) of FIG. 6 illustrates how the driving current varies in time, and view (e) of FIG. 6 illustrates how the correction current difference varies in time. In other words, according to this embodiment, the correction current difference is calculated from the relationship between the driving current and the steady current (step S2), the calculated correction current difference is added to the sum of all the previous correction current differences to calculate the correction threshold current (estimate the variation in the threshold current) (step S3), the driving current is corrected with the calculated correction threshold current, and the steady current employed for next correction is calculated from the calculated correction threshold current (step S4). Thus, as shown in view (b) of FIG. 6, the variation in the light output can be effectively inhibited, and an excellent white balance can be maintained.

According to this embodiment, as hereinabove described, the laser projector 1 is provided with the threshold current correction portion 24 estimating the variation in the threshold current of the laser beam source 2 (2a to 2c) and correcting the driving current on the basis of the estimated variation in the threshold current, whereby the variation in the light output from the laser beam source 2 can be effectively inhibited by estimating the variation in the threshold current of the laser beam source 2 and correcting the driving current while reflecting this. Thus, the white balance can be maintained.

According to this embodiment, as hereinabove described, the threshold current correction portion 24 is configured to estimate the variation in the threshold current by calculating the amount of change of the threshold current for each prescribed time and summing the amount of change of the threshold current. Thus, the variation in the threshold current can be accurately estimated by such a method as to calculate the amount of change (the difference) of the threshold current for each prescribed time and sum the same, and hence the variation in the light output from the laser beam source 2 can be effectively inhibited.

According to this embodiment, as hereinabove described, the threshold current correction portion 24 is configured to update the threshold current by adding the amount of change of the threshold current for each prescribed time to the present threshold current so as to estimate the variation in the threshold current. Thus, the present threshold current obtained by adding up the amount of change (the difference) of the threshold current for each prescribed time is updated from time to time to estimate the variation, and hence the variation in the threshold current can be accurately estimated for each prescribed time according to the driving current.

According to this embodiment, as hereinabove described, the threshold current correction portion 24 is configured to employ the threshold current at the projection start position of one frame as the initial value of the threshold current. Thus, after a blanking period during which the output of the laser beam is stopped, an estimation error of the threshold current can be initialized frame by frame.

According to this embodiment, as hereinabove described, the laser projector 1 is provided with the variation characteristics calculation portion 27 measuring the variation in the output from the laser beam source 2 when the laser beam source 2 operates with the driving current having the prescribed measurement pattern and acquiring the variation characteristics employed for the estimation of the variation in the threshold current on the basis of the measured variation in the output. Thus, the threshold current correction portion 24 can easily correct the driving current on the basis of the variation characteristics acquired by the variation characteristics calculation portion 27.

According to this embodiment, as hereinabove described, the prescribed measurement pattern includes a pattern of increasing the driving current and a pattern of decreasing the driving current. Thus, the driving current can be corrected correspondingly to both cases of the reduction of the laser beam output and the recovery of the laser beam output.

According to this embodiment, as hereinabove described, the variation characteristics calculation portion 27 is configured to acquire the variation characteristics employed for the estimation of the variation in the threshold current on the basis of the driving current and the light quantity of the laser beam detected by the photodetector 26. Thus, the photodetector 26 detects the change of the light quantity of the laser beam, whereby the variation characteristics calculation portion 27 can easily acquire the variation characteristics.

According to this embodiment, as hereinabove described, the photodetector 26 is configured to detect the laser beam for detection branched by the branching unit 25. Thus, the photodetector 26 detects the change of the light quantity of the laser beam for detection branched by the branching unit 25, whereby the variation characteristics calculation portion 27 can easily acquire the variation characteristics.

According to this embodiment, as hereinabove described, the variation characteristics calculation portion 27 is configured to acquire the variation characteristics employed for the estimation of the variation in the threshold current on the basis of the laser beam output to the outside of the image display area during image display. Thus, the influence of the laser beam for detection on the image display can be prevented when the variation characteristics are acquired, and processing time can be reduced as compared with the case where a dedicated period for acquiring the variation characteristic is separately provided.

According to this embodiment, as hereinabove described, the laser projector 1 is provided with the adding portion 23 adding the correction current output from the threshold current correction portion 24 to the current output from the current conversion portion 21. Thus, the variation in the output of the laser beam can be effectively inhibited by adding the correction current output from the threshold current correction portion 24 to the current based on the image information signal, and hence the white balance can be easily maintained.

According to this embodiment, as hereinabove described, the laser projector 1 is provided with the I-L characteristics calculation portion 28 acquiring the relationship between the current and the light quantity on the basis of the driving current and the light quantity of the laser beam detected by the photodetector 26. Thus, the I-L characteristics calculation portion 28 can easily acquire the relationship between the current and the light quantity for converting the image information signal into the laser beam.

According to this embodiment, as hereinabove described, the branching unit 25 is provided in the optical path of the synthesized beam obtained by synthesizing the laser beams of a plurality of color components, and the I-L characteristics calculation portion 28 is configured to allow a plurality of laser beam sources 2a to 2c (the laser beam source 2) one by one to output the laser beams and acquire the relationship between the current and the light quantity (the I-L characteristics) on the basis of the light quantity of the branched laser beam of one color component detected by the photodetector 26 and the driving current. Thus, the branching unit 25 and the photodetector 26 can be shared for the color components of R, G, and B, and hence the number of components can be reduced.

According to this embodiment, as hereinabove described, the I-L characteristics calculation portion 28 is configured to acquire the relationship between the current and the light quantity on the basis of the laser beam output to the outside of the image display area during image display. Thus, the influence of the laser beam for detection on the image display can be prevented when the relationship between the current and the light quantity (I-L characteristics) is acquired, and the processing time can be reduced as compared with the case where a dedicated period for acquiring the relationship between the current and the light quantity is separately provided.

According to this embodiment, as hereinabove described, the laser projector 1 is provided with the output selection portion 22 selecting from among the current output from the variation characteristics calculation portion 27, the current output from the current conversion portion 21, and the current output from the I-L characteristics calculation portion 28 and outputting the selected current to the laser beam source 2. Thus, the variation characteristics calculation portion 27, the current conversion portion 21, or the I-L characteristics calculation portion 28 is selected to output the current according to the case of acquiring the variation characteristics, the case of displaying the image, or the case of acquiring the relationship between the current and the light quantity, and hence control of the current can be easily performed in each case.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the laser projector in the aforementioned embodiment, the present invention is not restricted to this. The present invention may alternatively be applied to an electronic apparatus such as a portable projector, a portable telephone, etc.

While the processing performed by the driving current correction portion according to the present invention is described, using the flowchart described in a flow-driven manner in which processing is performed in order along a processing flow for the convenience of illustration in the aforementioned embodiment, the present invention is not restricted to this. According to the present invention, the processing performed by the driving current correction portion may alternatively be performed in an event-driven manner in which processing is performed on an event basis. In this case, the processing performed by the driving current correction portion may be performed in a complete event-driven manner or in a combination of an event-driven manner and a flow-driven manner.

What is claimed is:

1. An image display apparatus comprising:
    a plurality of light source portions outputting laser beams of a plurality of color components different from each other;
    a synthesized beam generation portion synthesizing the laser beams of the plurality of color components;
    a control portion controlling outputs of the light source portions;
    an acquisition portion acquiring a variation in an output of each of the light source portions with a driving current having a prescribed variation pattern;
    a correction portion employing the variation characteristics previously acquired and correcting the driving current on the basis of an estimated variation in a threshold current, the correction portion employing the threshold current;
    a current conversion portion generating a current supplied to the plurality of light source portions on the basis of an input image information signal; and
    an output selection portion selecting from among a current output from the acquisition portion, and a current output from the current conversion portion and outputting a selected current to the light source portions.

2. The image display apparatus according to claim 1, wherein
    the correction portion estimates the variation in the threshold current by calculating an amount of change of the threshold current for each prescribed time and summing the amount of change of the threshold current.

3. The image display apparatus according to claim 2, wherein
    the correction portion updates the threshold current by adding the amount of change of the threshold current for each prescribed time to a present threshold current so as to estimate the variation in the threshold current.

4. The image display apparatus according to claim 1, wherein
    the correction portion employs the threshold current at a projection start position of one frame as an initial value of the threshold current.

5. The image display apparatus according to claim 1, wherein
    the prescribed variation pattern includes a pattern of increasing the driving current and a pattern of decreasing the driving current.

6. The image display apparatus according to claim 1, further comprising a detection portion detecting a light quantity of a laser beam, wherein
    the acquisition portion acquires the variation characteristics employed for the estimation of the variation in the threshold current on the basis of the driving current and the light quantity of the laser beam detected by the detection portion.

7. The image display apparatus according to claim 6, further comprising a branching unit branching the laser beams output from the light source portions into a laser beam for image display and a laser beam for detection, wherein
    the detection portion detects the laser beam for detection branched by the branching unit.

8. The image display apparatus according to claim 1, wherein
    the acquisition portion acquires the variation characteristics employed for the estimation of the variation in the threshold current on the basis of a laser beam output to an outside of an image display area during image display.

9. The image display apparatus according to claim 1, further comprising:
    a current generation portion generating a current supplied to the plurality of light source portions on the basis of an input image information signal; and
    an adding portion adding a correction current output from the driving current correction portion to the current output from the current generation portion.

10. The image display apparatus according to claim 1, further comprising:
    a detection portion detecting a light quantity of a laser beam; and
    a current-light quantity characteristics acquisition portion acquiring a relationship between a current and a light quantity on the basis of the driving current and the light quantity of the laser beam detected by the detection portion.

11. The image display apparatus according to claim 10, further comprising a branching unit branching the laser beams output from the light source portions into a laser beam for image display and a laser beam for detection, wherein
    the detection portion detects the laser beam for detection branched by the branching unit.

12. The image display apparatus according to claim 11, wherein
    the branching unit is provided in an optical path of a synthesized beam obtained by synthesizing the laser beams of the plurality of color components, and
    the current-light quantity characteristics acquisition portion allows the plurality of light source portions one by one to output the laser beams and acquire the relationship between the current and the light quantity on the basis of a light quantity of a branched laser beam of one color component detected by the detection portion and the driving current.

13. The image display apparatus according to claim 10, wherein
the current-light quantity characteristics acquisition portion acquires the relationship between the current and the light quantity on the basis of a laser beam output to an outside of an image display area during image display.

14. The image display apparatus according to claim 1, further comprising:
an acquisition portion measuring a variation in an output of each of the light source portions when the light source portions each operate with the driving current having a prescribed variation pattern and acquiring variation characteristics employed for estimation of the variation in the threshold current; and
a current-light quantity characteristics acquisition portion acquiring a relationship between a current and a light quantity on the basis of the driving current and a light quantity of a laser beam;
wherein the output selection portion selects from among a current output from the acquisition portion, a current output from the current conversion portion, and a current output from the current-light quantity characteristics acquisition portion and outputs a selected current to the light source portions.

15. An electronic apparatus having a projector function, comprising:
a plurality of light source portions outputting laser beams of a plurality of color components different from each other;
a synthesized beam generation portion synthesizing the laser beams of the plurality of color components;
a control portion controlling outputs of the light source portions;
an acquisition portion acquiring a variation in an output of each of the light source portions with a driving current having a prescribed variation pattern;
a correction portion employing the variation characteristics previously acquired and correcting a driving current on the basis of an estimated variation in the threshold current, the correction portion employing the threshold current;
a current conversion portion generating a current supplied to the plurality of light source portions on the basis of an input image information signal; and
an output selection portion selecting from among a current output from the acquisition portion, and a current output from the current conversion portion and outputting a selected current to the light source portions.

16. The electronic apparatus having a projector function according to claim 15, wherein
the correction portion estimates the variation in the threshold current by calculating an amount of change of the threshold current for each prescribed time and summing the amount of change of the threshold current.

17. The electronic apparatus having a projector function according to claim 16, wherein
the correction portion updates the threshold current by adding the amount of change of the threshold current for each prescribed time to a present threshold current so as to estimate the variation in the threshold current.

18. The electronic apparatus having a projector function according to claim 15, wherein
the correction portion employs the threshold current at a projection start position of one frame as an initial value of the threshold current.

19. The electronic apparatus having a projector function according to claim 15, further comprising an acquisition portion measuring a variation in an output of each of the light source portions when the light source portions each operate with the driving current having a prescribed variation pattern and acquiring variation characteristics employed for estimation of the variation in the threshold current on the basis of a measured variation in the output, wherein
the prescribed variation pattern includes a pattern of increasing the driving current and a pattern of decreasing the driving current.

* * * * *